United States Patent
Pannicke

(10) Patent No.: US 11,554,897 B2
(45) Date of Patent: Jan. 17, 2023

(54) PALLET SYSTEM AND A MEASURING COMPONENT

(71) Applicant: CHEP Technology Pty Limited, Sydney (AU)

(72) Inventor: Marco Pannicke, Cologne (DE)

(73) Assignee: CHEP Technology Pty Limited, Sydney (AU)

(*) Notice: Subject to any disclaimer, the term of this patent is extended or adjusted under 35 U.S.C. 154(b) by 141 days.

(21) Appl. No.: 16/754,423

(22) PCT Filed: Oct. 11, 2018

(86) PCT No.: PCT/EP2018/077749
§ 371 (c)(1),
(2) Date: Apr. 8, 2020

(87) PCT Pub. No.: WO2019/072975
PCT Pub. Date: Apr. 18, 2019

(65) Prior Publication Data
US 2021/0198004 A1    Jul. 1, 2021

(30) Foreign Application Priority Data

Oct. 12, 2017  (IT) .................. 102017000115209

(51) Int. Cl.
*B65D 19/38* (2006.01)
*F16B 5/06* (2006.01)
(Continued)

(52) U.S. Cl.
CPC ............ *B65D 19/38* (2013.01); *F16B 5/0642* (2013.01); *G01L 1/142* (2013.01); *G06F 3/0445* (2019.05);
(Continued)

(58) Field of Classification Search
CPC .......... B65D 2519/00338; B65D 2519/00771; B65D 2519/00268; B65D 2519/0094;
(Continued)

(56) References Cited

U.S. PATENT DOCUMENTS 4,273,204 A * 6/1981 Gillen .................... G01G 7/06
                                                361/278
4,372,405 A * 2/1983 Stuart .................. G01G 23/42
                                                73/437
(Continued)

FOREIGN PATENT DOCUMENTS

CN         1492994      4/2004
CN         1555483      12/2004
(Continued)

*Primary Examiner* — Jermele M Hollington
*Assistant Examiner* — Suresh K Rajaputra
(74) *Attorney, Agent, or Firm* — Allen, Dyer, Doppelt + Gilchrist, PA

(57) ABSTRACT

A pallet system (10) for transporting goods has a pallet (12) and a measuring component (14) located on top of the upper surface (18) of the pallet (12). The measuring component (14) comprises a first conductive layer (32) and a second conductive layer (34) spaced apart from each other forming a capacitor with a gap (36). At least one elastic element (30) is arranged within the gap, and a control unit (31) is electrically connected to the first conductive layer (32) and the second conductive layer (34), wherein the control unit (31) is configured to measure the capacitance of the capacitor. Further, a measuring component (14) is shown.

20 Claims, 5 Drawing Sheets

Figure 1:
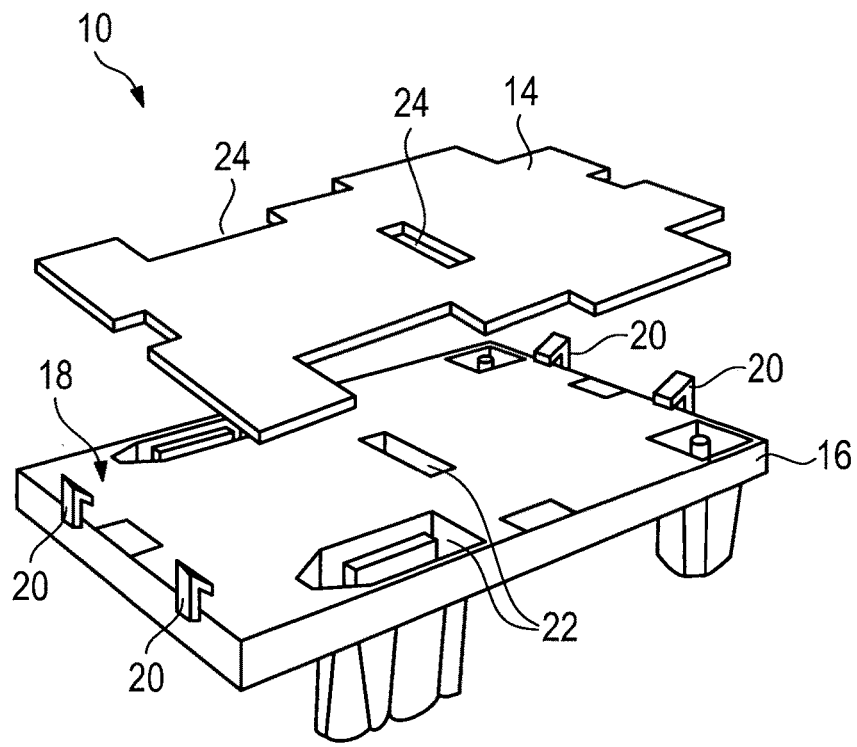

(51) Int. Cl.
*G06F 3/044* (2006.01)
*G01L 1/14* (2006.01)

(52) U.S. Cl.
CPC ........... *B65D 2519/0094* (2013.01); *B65D 2519/00268* (2013.01); *B65D 2519/00338* (2013.01)

(58) Field of Classification Search
CPC ......... B65D 19/38; G01L 1/142; G01L 1/146; F16B 21/086; F16B 5/06; F16B 5/0642; G06F 3/0445
See application file for complete search history.

(56) References Cited

U.S. PATENT DOCUMENTS

| | | | | |
|---|---|---|---|---|
| 4,649,759 | A * | 3/1987 | Lee | G01L 1/142 |
| | | | | 177/210 C |
| 4,994,793 | A * | 2/1991 | Curtis | G08B 13/1472 |
| | | | | 307/119 |
| 8,061,211 | B1 * | 11/2011 | Bennett | F16J 15/064 |
| | | | | 73/706 |
| 2004/0052611 | A1 | 3/2004 | Liu | |
| 2007/0248799 | A1 * | 10/2007 | DeAngelis | G06F 3/0446 |
| | | | | 428/209 |
| 2010/0107934 | A1 | 5/2010 | Hsieh | |
| 2012/0062245 | A1 | 3/2012 | Bao et al. | |
| 2018/0073942 | A1 * | 3/2018 | Wu | G01L 5/165 |
| 2020/0056929 | A1 * | 2/2020 | Kempf | G01G 19/415 |

FOREIGN PATENT DOCUMENTS

| | | |
|---|---|---|
| CN | 101421692 | 4/2009 |
| CN | 101749989 | 3/2010 |
| CN | 103210457 | 7/2013 |
| CN | 204137478 | 2/2015 |
| CN | 106660663 | 5/2017 |
| CN | 101809422 | 8/2021 |
| JP | 2006017466 | 1/2006 |
| WO | WO2010135488 | 11/2010 |

* cited by examiner

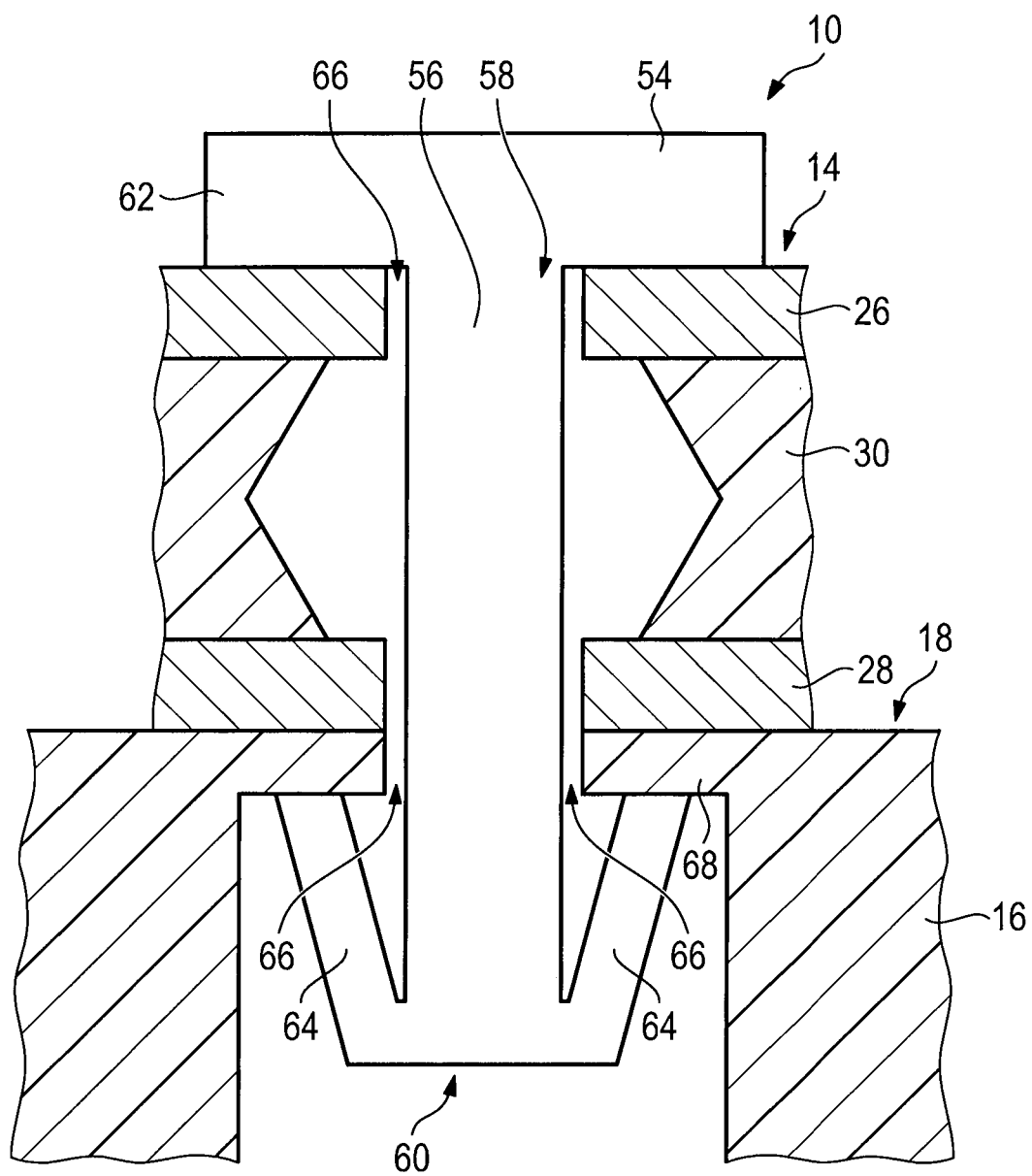

PALLET SYSTEM AND A MEASURING COMPONENT

The invention relates to a pallet system for transporting goods as well as to a measuring component for a pallet system.

Pallets are known in the logistics industry as standardized supports with predefined dimensions for transporting goods. Quarter pallets, i.e. pallets with the size of a quarter of a euro-pallet are used e.g. in food logistics or supply chain logistics where smaller amounts of goods are to be delivered regularly.

In highly integrated supply chains, ordering the next batch of supplies in time is an important task. Thus, the amount of goods on a specific pallet has to be checked regularly creating the need for an automated solution.

Thus, it is the object of the invention to provide a pallet system and a measuring component for a pallet system that can be used to automatically determine the amount of goods stored on the respective pallet.

For this purpose a pallet system for transporting goods is provided, comprising a pallet having a pallet body with an upper surface and a measuring component located on top of the upper surface. The measuring component comprises a first conductive layer and a second conductive layer spaced apart from each other forming a capacitor with a gap, wherein at least one elastic element is arranged within the gap allowing movement of the first conductive layer and the second conductive layer towards each other. A control unit of the measuring component is electrically connected to the first conductive layer and the second conductive layer, wherein the control unit is configured to measure the capacitance of the capacitor. The layers are parallel to each other, for example. Further, the pallet may be a quarter pallet and/or a nestable pallet.

When goods are present on the pallet system, i.e. on the measuring component, the elastic elements are compressed by the weight of the goods so that the first conductive layer and the second conductive layer are moved closer together and the size of the gap changes. This change in size can be measured by measuring the capacitance of the capacitor using the control unit.

The capacitance of the capacitor is therefore a measure for the weight of the goods loaded onto the pallet. Thus, the control unit can obtain the weight of the goods loaded onto the pallet automatically and may also recognize if the goods or supplies on the pallet are running low and have to be reordered.

In order to implement the pallet system into a larger computer system the control unit may have interfaces like Bluetooth, WI-FI, ZigBee, Ethernet, etc.

The pallet, more precisely the pallet body may be made from a single material, in particular a plastics material, and/or as a single piece. Preferably, the pallet body is manufactured using injection molding, in particular as a single piece.

For example, the pallet is a quarter pallet used in logistics, especially for retailers. Quarter pallets may have dimensions of 600×400 mm.

The pallet may also be a dolly.

Preferably, the measuring component has a plate-like shape, in particular covering the majority or even the entirety of the upper surface so that the height of the pallet system is kept as low as possible and a measurement across the whole surface can be provided.

In one embodiment of the invention, the measuring component comprises a first shielding layer and a second shielding layer, wherein the first conductive layer and the second conductive layer are located between the first shielding layer and the second shielding layer. The shielding layer may also be made of a conductive material. All layers may be parallel to each other. The shielding layers reduce the influence on the measurement of the capacitance originating from electrostatic charges and conductive materials (metals, liquids, etc.) close to the first and second conductive layer.

Preferably, the measuring component comprises a first base body and a second base body, the first base body supporting the first conductive layer and/or the first shielding layer, and the second base body supporting the second conductive layer and/or the second shielding layer to achieve a compact construction. The base body may have a plate- or a board-like shape. The conductive layers and/or the shielding layers may be coated onto the respective base bodies.

To achieve a high measurement precision, the first base body and the second base body are parallel to each other in an unloaded state of the pallet system, wherein the first conductive layer is provided at the side of the first base body facing towards the second base body, and wherein the second conductive layer is provided at the side of the second base body facing towards the first base body.

For optimal shielding, the first shielding layer is provided at the side of the first base body facing away from the second base body and the second shielding layer is provided at the side of the second base body facing away from the first base body.

In a variation, the first conductive layer, the second conductive layer, the first shielding layer and/or the second shielding layer cover the majority, in particular the whole surface of the respective side of the respective base body. This way, the measurement sensitivity across the surface of the pallet can be increased.

Preferably, the first base body and the second base body are parallel to the upper surface of the pallet and/or the first base body and the second base body are extending over at least half, in particular at least three quarters of the upper surface of the pallet increasing measurement precision even further.

The first base body and/or the second base body may be a circuit board, in particular a circuit board made of FR-4. This way, a cheap and reliable base body can be provided.

For reducing costs even further, the control unit is fixed to the first base body or the second base body, in particular the control unit is integrated into a circuit of the circuit board.

In another embodiment of the invention, the measurement component has holes and/or cut-outs corresponding to holes and/or cut-outs in the upper surface of the pallet, respectively, in order to maintain the functionality of the pallet itself. The holes and cut-outs may extend through all layers and bodies of the measuring component.

In another aspect, the at least one elastic element is made of foamed material, in particular a rubber foam to provide the necessary compression characteristics. The rubber foam may be made out of nitrile rubber, chloroprene rubber, natural rubber, ethylene-propylene-diene rubber and/or styrene-butadiene rubber.

For example, the horizontal dimensions of the elastic element varies in the vertical direction. The vertical direction is the direction perpendicular to the upper surface of the pallet. By varying the width, progressive responses of the measurement to the amount of weight loaded onto the pallet system can be achieved.

For example, in a top view of one of the conductive layers the percentage of the total surface of the conductive layer occupied by the at least one elastic element is equal to or smaller than 10%, in particular equal to or smaller than 5%, and/or the percentage of the total volume of the gap occupied by the at least one elastic element is equal to or smaller than 20%, in particular equal to or smaller than 10%. The rest of the gap may be filled with air. This way, a lightweight and sensitive measurement component can be provided.

In a variation, the at least one elastic element comprises a base portion and a vertical portion, wherein in a top view of one of the conductive layers the percentage of the total surface of the conductive layer occupied by the vertical portions is equal to or smaller than 10%, in particular equal to or smaller than 5% and/or wherein the percentage of the total volume of the gap occupied by the vertical portion of the at least one elastic element is equal to or smaller than 20%, in particular equal to or smaller than 10%. This way, sufficient range of movement of the conductive layers towards each other is ensured.

The at least one elastic element may be attached to the first conductive layer and/or the second conductive layer to simplify the construction.

A uniform response of the measurement even in cases with uneven loads can be achieved by arranging the at least one elastic element or vertical portions of the at least one elastic element in a uniform pattern or grid.

For providing a reliable measurement system, the measuring component may be fixed to the upper surface of the pallet, for example by suitable fixation means of the pallet like hooks or recesses.

In another embodiment of the invention, the pallet comprises a display section for receiving a display, wherein the measuring component comprises at least one measuring section arranged at the display section. This way, the weight of goods presented in a display can be determined very precisely.

In the measuring section, the above-mentioned capacitor is formed by the first conductive layer and the second conductive layer.

The measuring section may be the only measuring section of the measuring component.

The pallet system may also comprise a display mounted on the pallet and/or measuring component. Preferably, the display rests on the display section of the pallet.

For example, the display section and/or the measuring section has a rectangular shape and/or extends along the edge of the upper surface allowing to use most of the space provided by the pallet for storing and displaying goods.

In a variant, two measuring sections of the measuring component are provided in the display section, in particular the measuring sections having a U-shape. This allows to weigh goods precisely, even if displays with half of the size of the pallet are used. The display may be sized as one-eighth of a pallet.

For example, the U-shapes of the measuring sections are facing each other, i.e. are open towards each other. The two measuring sections may form a rectangle.

In another embodiment, the measuring component comprises at least one auxiliary measuring section, wherein the at least one auxiliary measuring section is surrounded by the at least one measuring section. The auxiliary measuring section allow a very precise measurement if the pallet is used without a display.

In this case, surrounded means surrounded at three, in particular at all four sides seen in a top view of the pallet system.

The control unit may be configured to evaluate each measuring section separately and/or to evaluate a combination of two or more measuring sections together. In particular, the control unit may determine automatically whether a single measuring section or a combination of measuring sections has to be evaluated in a given scenario.

In yet another embodiment, the measuring component comprises a temperature sensor, in particular for calibrating the measurement of the capacitance of the capacitor. This way, the measurement precision of the measurement component may be improved even further.

The calibration may be performed for temperatures at least between −20° C. and 40° C.

In another embodiment, the pallet system comprises at least one fixation element extending through openings in the first conductive layer and/or the first base body as well as in the second conductive layer and/or the second base body in order to fix the first conductive layer to the second conductive layer. In particular, the fixation element extends vertically through, i.e. perpendicular to the first and second conductive layer.

Preferably, the fixation element engages in an opening of the upper surface for securing the measuring component to the pallet. Each fixation element may engage in a separate opening, i.e. openings in layers and/or the pallet.

In a variant, the fixation element has an elongated portion having a diameter smaller than the diameter of the openings, wherein a collar is provided at a first end of the elongated portion and at least one flexible tongue is provided at a second end of the elongated portion. This way, the fixation element may be manufactured easily.

In particular, the collar has a diameter larger than the diameter of the openings, i.e. openings in layers and/or the pallet.

For ease of assembly, the flexible tongues may extend from the second end of the elongated portion towards the first end and/or the tongues may engage a protrusion of the upper surface defining the opening. Thus, the fixation element may be inserted and fastened without tools.

Further, a measuring component is provided for a pallet system according to the invention.

Figure 2:
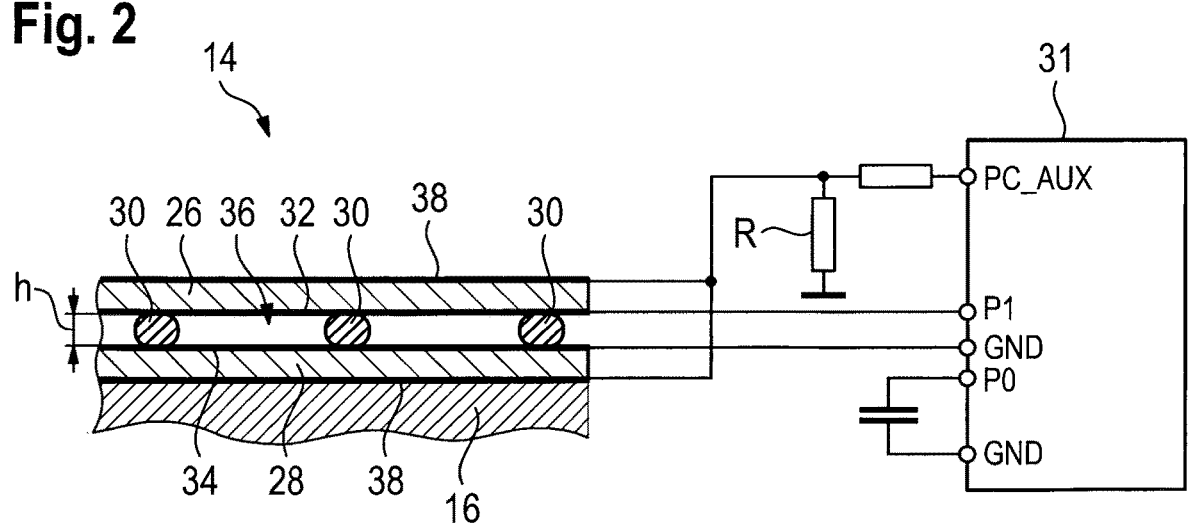
Figure 3:
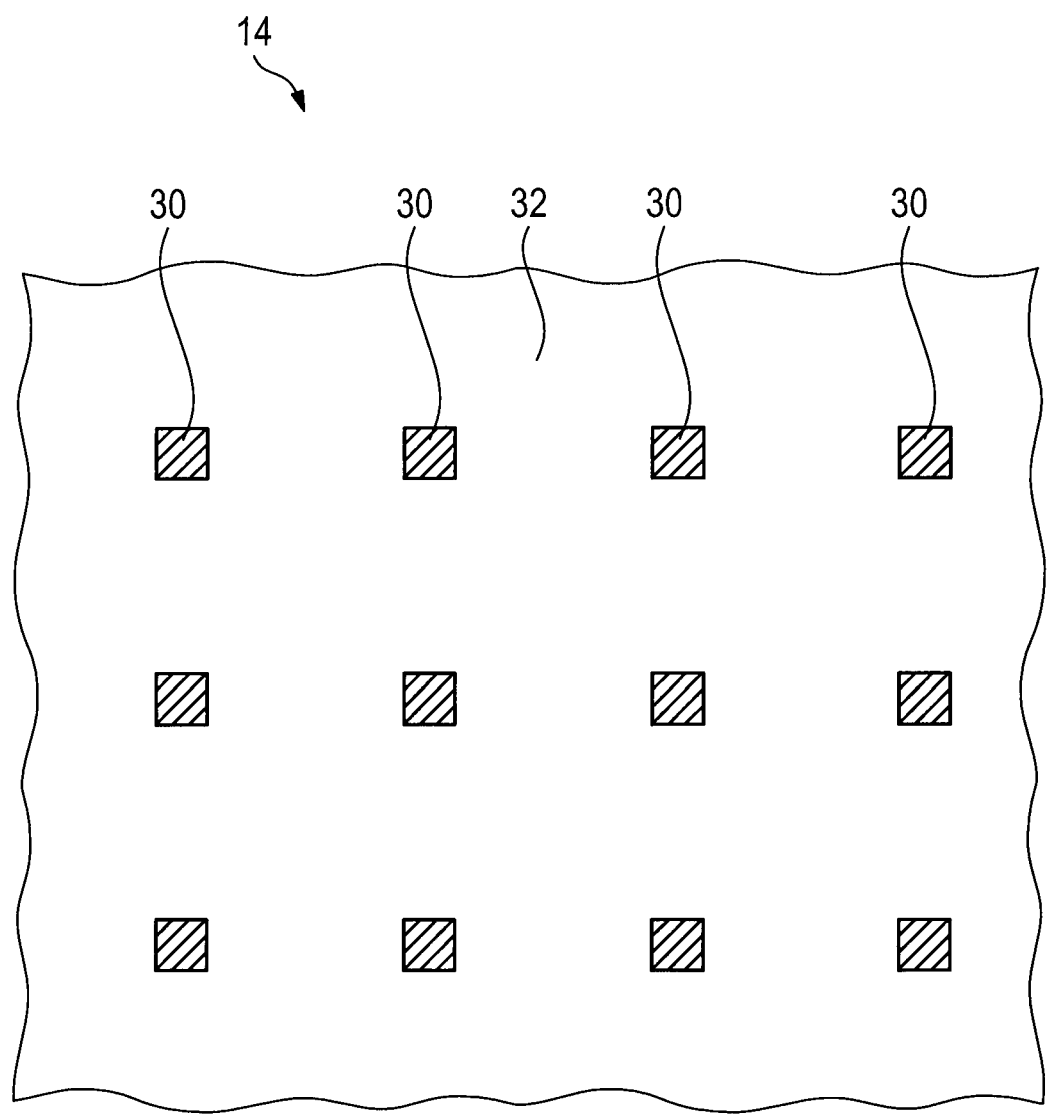
Figure 4:
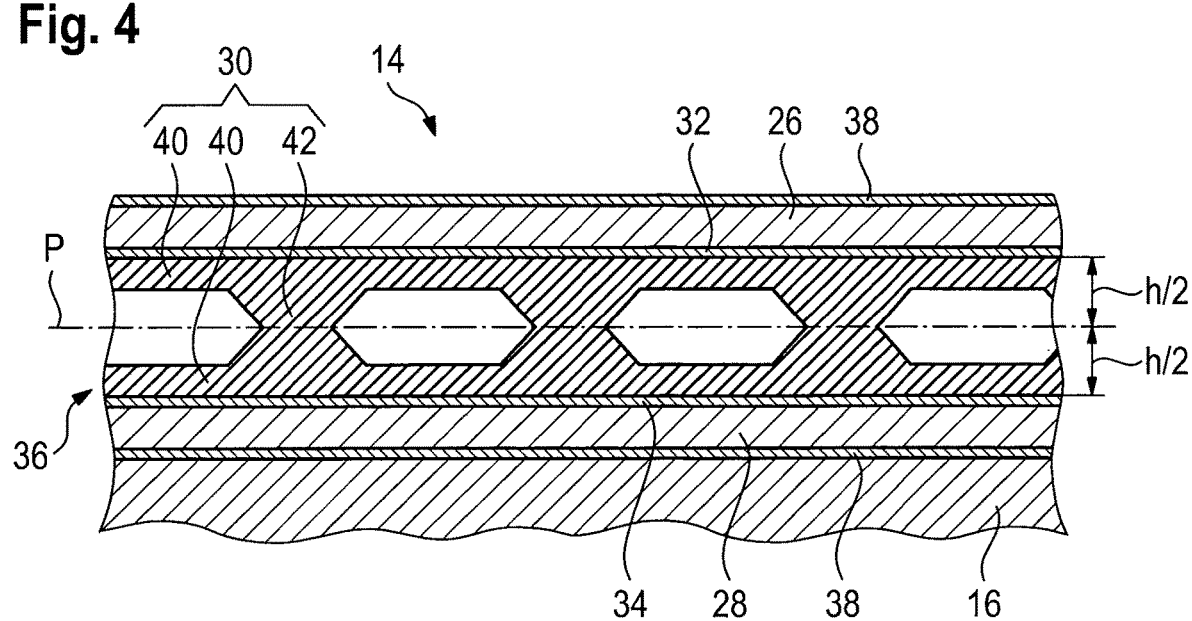
Figure 5:
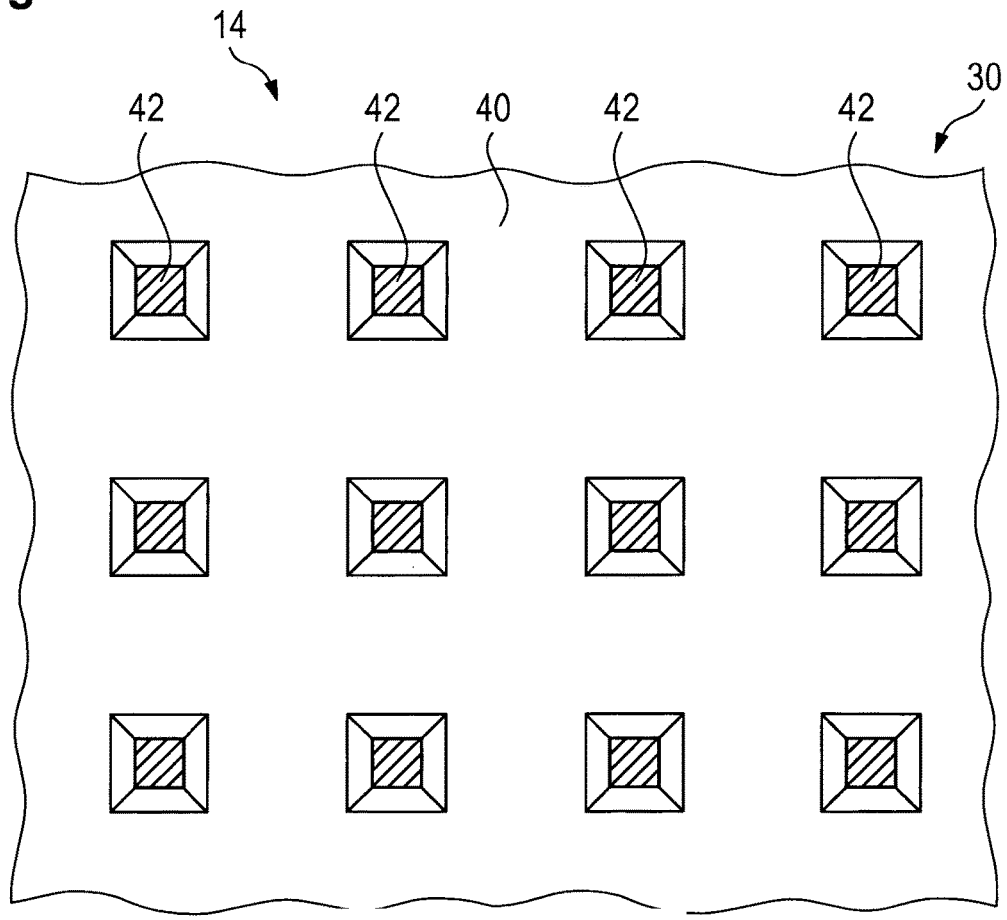
Figure 6:
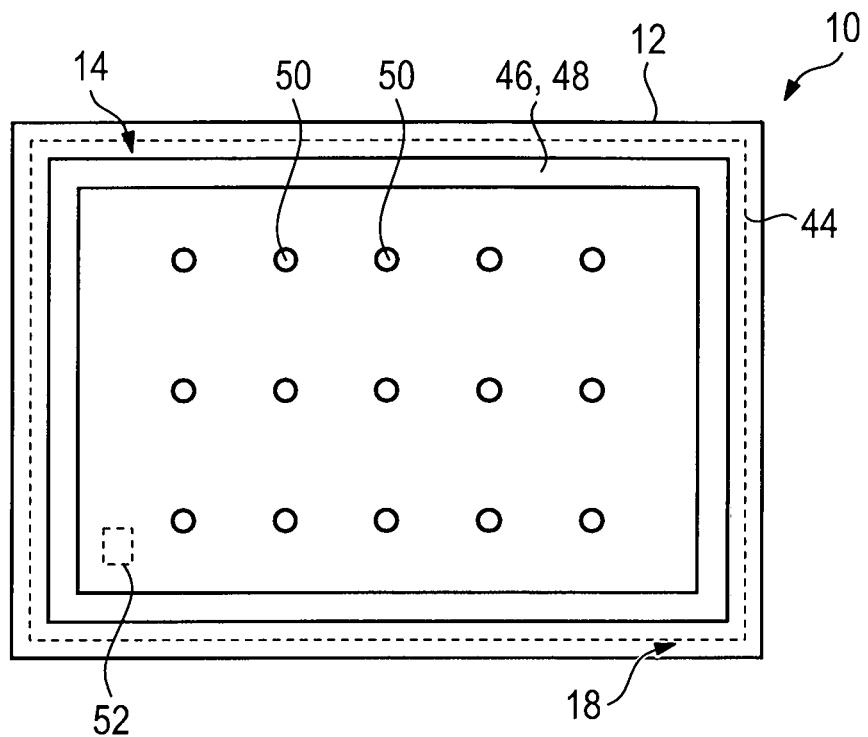
Figure 7:
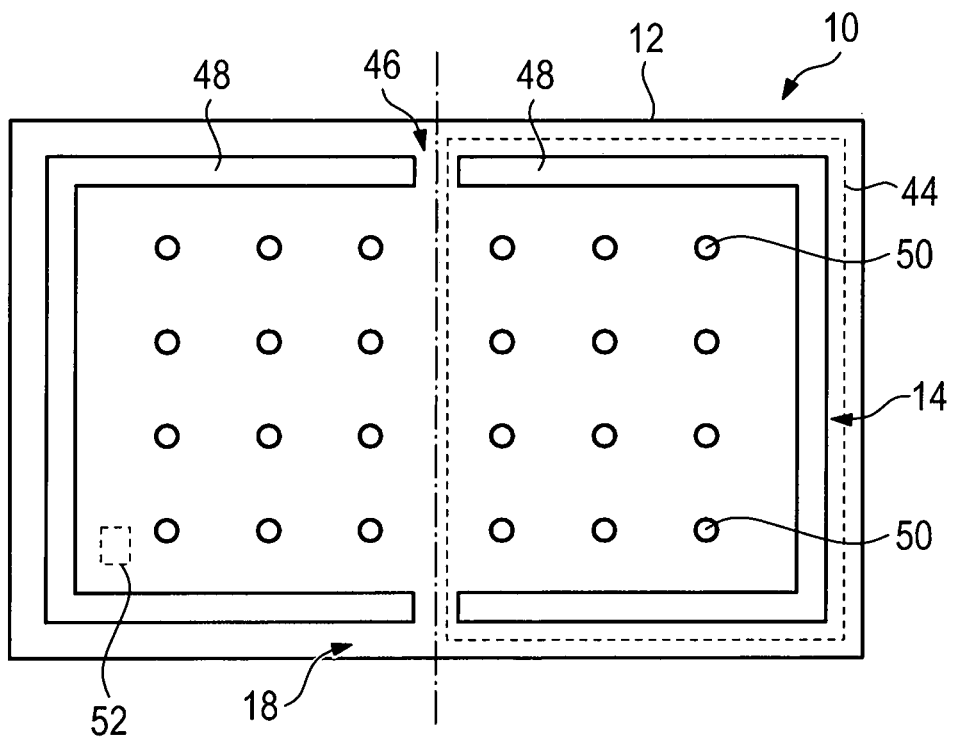

Additional features and advantages of the invention will be apparent from the following description of the embodiments and the attached drawings to which reference is made. In the drawings:

FIG. 1 shows a pallet system according to the invention with a measuring component according to the invention in an exploded view, FIG. 2 shows a cross section of part of the pallet system according to FIG. 1 with a schematic illustration of the circuits used for operating the measuring component, FIG. 3 shows a top view of part of one of the base bodies of the measuring component of FIG. 2, FIG. 4 shows a cross section of part of a measuring component according to a second embodiment of the invention, FIG. 5 shows a top view of part of one of the base bodies of the measuring component according to FIG. 4, FIG. 6 shows a top view of another embodiment of a pallet system according to the invention, FIG. 7 shows a top view of a further embodiment of a pallet system according to the invention, and FIG. 8 shows a fixation element in the pallet system to secure the measuring component in itself and/or to the pallet.

FIG. 1 shows a pallet system 10 for transporting goods having a pallet 12 and a measuring component 14.

The pallet 12 is, for example, a quarter pallet used for transporting and displaying goods such as groceries in a supermarket. The pallet 12 may be nestable, meaning that two empty pallets can be inserted into each other for transportation.

The pallet 12 comprises a pallet body 16 with an upper surface 18 and fixation means 20 in order to fix and hold the measuring component 14.

The pallet 12 more precisely the pallet body 16 may be made from a single material, in particular a plastics material, and/or as a single piece. Preferably, the pallet 12 and/or pallet body 16 is manufactured using injection molding, in particular as a single piece.

For example, the pallet 12 is a quarter pallet used in logistics, especially for retailers. Quarter pallets may have dimensions of 600×400 mm. The pallet 12 may also be a dolly.

The fixation means 20 may be hooks or recesses located at the upper surface 18.

The pallet body 16 of the pallet 12 may comprise cut-outs 22 and holes that extend through the upper surface 18 of the pallet 12.

The measuring component 14 is flat, plate-like device that is arranged at the upper surface 18 of the pallet 12. The measuring component 14 is fixed to the upper surface 18 by the fixation means 20 and covers the majority of the upper surface 18.

Further, the measuring component 14 may also comprise cut-outs 24 or holes that are in alignment with at least some of the cut-outs 22 or holes of the pallet 12 when the measuring component 14 is fixed to the pallet 12.

As can be seen in FIG. 2, the measuring component 14 comprises a first base body 26, a second base body 28, a plurality of elastic elements 30 arranged between the first base body 26 and the second base body 28, and a control unit 31.

The first base body 26 and the second base body 28 are parallel to the upper surface 18 of the pallet 12 at least in an unloaded state of the pallet system 10.

The second base body 28 is in contact with the upper surface 18. Thus, during designated use of the pallet system 10, e.g. if the pallet is set up in a store, the second base body 28 lies below the first base body 26. The vertical direction is perpendicular to the upper surface 18 and the horizontal directions are parallel to the upper surface 18.

The first base body 26 and the second base body 28 are parallel plates or boards that have the same geometry and extend over at least half, in particular at least three quarters of the upper surface 18 of the pallet 12.

The base bodies 26, 28 do not cover the pallet 12 in areas where the upper surface 18 is interrupted, e.g. in the area of the feet of the pallet 12. This is done to maintain the functionality of the pallet 12, e.g. nestability, and/or to ensure best measurement quality as the supper surface 18 serves as a counter bearing for the measuring component 14.

The first base body 26 and the second base body 28 may be made out of FR-4 forming a circuit board. The thickness of the base bodies 26, 28 may be about 4 mm.

In the embodiments shown, a first conductive layer 32 is provided at the first base body 26 and a second conductive layer 34 is provided at the second base body 28.

The first conductive layer 32 is arranged at the lower side of the first base body 26, i.e. the side of the first base body 26 facing the second base body 28.

Vice versa, the second conductive layer 34 is located at the upper side of the second base body 28, i.e. the side of the second base body 28 facing the first base body 26.

The first conductive layer 32 and the second conductive layer 34 may cover the majority, in particular the whole surface of the respective side of the respective base body 26, 28, and may be manufactured by known manufacturing methods for printed circuit boards.

Due to the elastic elements 30, a gap 36 is present between the first conductive layer 32 and the second conductive layer 34. If the pallet system 10 is unloaded, the gap 36 may have a height h of 2 mm or smaller.

Further, the first base body 26 and/or the second base body 28 may comprise a shielding layer 38.

The shielding layer 38 of the first base body 26 is provided at its upper side, i.e. the side of the first base body 26 facing away from the second base body 28.

Vice versa, the shielding layer 38 of the second base body 28 is provided at its lower side, i.e. the side of the second base body 28 facing away from the first base body 26.

Thus, the first conductive layer 32 and the second conductive layer 34 are arranged between the shielding layers 38.

The shielding layers 38 may also be made of a conductive material and may also cover the majority, in particular the whole surface of the side of the respective base body 26, 28.

The first conductive layer 32, the second conductive layer 34 and both shielding layers 38 are parallel to each other in an unloaded state of the pallet system 10.

The cut-outs 24 and holes of the measuring component 14 extend through all of the layers 32, 34, 38 and base bodies 26, 28.

In the first embodiment, the elastic elements 30 have a cuboid shape and are arranged in a uniform pattern or grid across the surface of the respective base body 26, 28, more precisely the surface of the respective conductive layer 32, 34, as can be seen in FIG. 3.

For example, the elastic elements 30 are made of a foam material, in particular a rubber foam. The rubber foam may be made out of nitrile rubber, chloroprene rubber, natural rubber, ethylene-propylene-diene rubber, and/or styrene-butadiene rubber.

The height of the elastic elements 30 corresponds to the height h of the gap 36 in an unloaded state of the pallet system 10.

As can be seen in the top view of FIG. 3 showing one of the conductive layers 32, 34, the total area of the elastic elements 30 is equal or less than 10%, in particular equal or less than 5% of the total surface of the respective conductive layer 32, 34 and the respective base body 26, 28.

Further, as can be seen from FIGS. 2 and 3, the volume of the gap 36 that is occupied by the elastic elements 30 is 20% or less, in particular 10% or less than the total volume of the gap 36. The rest of the gap 36 is filled with air or other ambient gases.

The elastic elements 30 may be attached to the first conductive layer 32, the second conductive layer 34, the first base body 26, or the second base body 28.

The control unit 31 may be a microchip or the like integrated into either the first conductive layer 32 or the second conductive layer 34. This may be done by soldering the control unit 31 to the respective conductive layer 32, 34.

The first conductive layer 32, the second conductive layer 34, and both shielding layers 38 are connected to various ports or pins of the control unit 31.

In the shown embodiment, the first conductive layer is connected to port P1 whereas the second conductive layer 34 is connected to a grounded port GND.

Both of the shielding layers 38 may also be connected to a port of the control unit 31, namely a guarding port labeled PC AUX. Further, the shielding layers 38 may be grounded via a resistor R.

Further, as an external reference, a small capacitor of about 1 nF may be connected to another input/output port P0 and ground port GND, respectively.

During operation of the pallet system 10, the first conductive layer 32 and the second conductive layer 34 form a capacitor over the gap 36.

The control unit 31 is able to measure the capacitance of this capacitor.

If the pallet system 10 is loaded with goods, the weight of the goods is acting on the first base body 26 and the elastic elements 30 between both base bodies 26, 28.

Due to the weight, the elastic elements 30 are compressed so that the first base body 26 and the second base body 28 approach each other. As such, the first conductive layer 32 and the second conductive layer 34 move closer together reducing the size or height h of the gap 36. Thus, the capacitance of the capacitor reduces which in turn can be measured by the control unit 31.

The control unit 31 is configured to measure the capacitance continuously or in intervals. Because the reduction and capacitance of the capacitor depends on the gravitational force onto the elastic elements 30, i.e. the weight of the goods stored on the pallet system 10, the control unit 31 can determine the weight of the goods loaded onto the pallet system 10 using the measured capacitance.

In order to implement the pallet system 10 into a larger computer system, the control unit 31 may have interfaces like Bluetooth, WI-FI, ZigBee, Ethernet, etc.

In FIGS. 4 to 7, further embodiment of a measuring component 14 and/or a pallet system 10 are shown that corresponds substantially to the one described in FIGS. 1 to 3. Thus, only the differences are described in the following and same parts or parts with the same functionality are labeled with the same reference number.

FIG. 5 is a sectional view along a plane P located at half of the height h of the gap 36. This sectional view is a top view of one of the conductive layers 32, 34 at the same time.

The second embodiment differs from the first embodiment only in the design of the elastic element 30 and only one elastic element 30 is provided.

The elastic element 30 of the second embodiment comprises two base portions 40 and a plurality of vertical portions 42 connecting the base portions 40.

One of the base portions 40 is in contact with the first conductive layer 32 and other one is in contact with the second conductive layer 34. The base portions 40 may span across and cover the entire respective conductive layer 32, 34.

The vertical portions 42 spanning in the vertical direction between both base portions 40 and may have a bi-conic shape, i.e. starting from the plane P, the vertical portions 42 widen in both directions towards the base portions 40.

For example, starting from the base portion 40 at the second conductive layer 34 and progressing upwards, the horizontal dimensions of the vertical portion 42 decrease. At the plane P, the narrowest point of the vertical portion 42 is reached.

When proceeding further upwards, the vertical portions 42 widen until reaching the other base portion 40 at the first conductive layer 32.

The elastic element 30 is symmetric with respect to the plane P.

Even though the elastic element 30 of the second embodiment occupies much more of the volume of the gap 36, regarding the vertical portions alone, only 20% or less, in particular 10% or less of the total volume of the gap 36 is occupied by the vertical portions 42.

Likewise, in a top view on one of the conductive layers 32, 34 (FIG. 5), the total surface occupied by the vertical portions 42 is less than 10%, in particular less than 5% at plane P.

The bi-conic shape of the vertical portions 42 may lead to a progressive response of the capacitance, allowing more sensitive measurements of low loads on the pallet system 10 and a reduced accuracy but large range for heavy loads.

The vertical portions 42 have quadratic cross sections. However, the cross sections may have any other shape, in particular a circular shape.

It is of course possible to combine the features of both embodiments. In particular, the elastic elements 30 of the first embodiment may also have a bi-conic or otherwise tapered shape.

FIG. 6 shows a third embodiment of a pallet system 10 in a top view.

In this embodiment, the pallet system 10 may comprise a display 44 (indicated with dashed lines) mounted to the upper surface 18 of the pallet 12 at a display section 46 of the upper surface 18. Mounting displays 44 to pallets 12 is per se known so that the known pallets 12 more precisely the upper surfaces 18 have a predefined display section 46.

In the display section 46, i.e. at the sections above the display sections 46, the measuring component 14 of the shown embodiment comprises a measuring section 48, i.e. a section of the measuring component 14 in which a capacitor is formed by the first conductive layer 32 and the second conductive layer 34.

In the shown embodiment, the display 44, the display section 46 and the measuring section 48 extend at the edge of the upper surface 18 of the pallet body 16 and have a rectangular shape. Especially the display section 46 forms a closed ring near the edge of the upper surface 18.

The measuring section 48 may be congruent with the display section 46. The measuring section 48 may be the only measuring section 48 of the measuring component 14.

It is also possible that more than one measuring section 48 is provided in the display section 46 that cover the majority of the area of the display section 46.

In the shown embodiment, the measuring component 14 comprises also auxiliary measuring sections 50 that lie within the display section 46.

The auxiliary measuring sections 50 may be designed as circles or dots and may be arranged in a grid. The arrangement may be similar to the embodiments discussed above.

The measuring section 48 and the auxiliary measuring sections 50 are designed and function in the same way as described above.

The control unit 31 is thus connected to both, the measuring section 48 and the auxiliary measuring sections 50 and it is adapted to evaluate the measurements of the measuring section 48 separately from the auxiliary measuring sections 50 in order to determine the weight of the display 44 and the goods stored in the display 44. In this case, the measurement values of the auxiliary measuring sections 50 are not relevant as the weight of the goods stored on the pallet 12 rests solely on the display section 46.

Further, the control unit 31 is configured to evaluate the combination of the measurements of the measuring section 48 and the auxiliary together to determine the weight of goods stored on the upper surface 18 without a display 44.

The control unit 31 may determine by itself, whether goods are stored on the pallet using a display 44 or not and hence which measuring sections 48, 50 have to be evaluated.

This may be done by evaluating the measurements of the auxiliary measuring sections 50, because the weight measured by the auxiliary measuring sections 50 is small or close to zero if a display 44 is used.

In this embodiment, the measuring component 14 also comprises a temperature sensor 52 that is connected to the control unit 31.

The temperature sensor 52 measures the temperature of the pallet system 10 and/or of its surrounding and transmits that information to the control unit 31. The temperature range may be −20° C. to 40° C.

Based on the temperature values received, the control unit 31 calibrates the measurement of the capacity and/or the calculation of the weight as temperature changes lead to changes in the dielectric properties of the air between the conductive layers 32, 34 and/or also influences the compressibility of the elastic elements 30.

If these and/or other dependencies are taken into account, the control unit is able to detect a weight difference of the goods stored on the pallet 12 of about 100 g.

It is obvious that the temperature sensor 52 may also be provided in the embodiments of FIGS. 1 to 5.

FIG. 7 show yet another embodiment being closely related to the embodiment shown in FIG. 6 so that only the differences are discussed.

In this embodiment, two measuring sections 48 are provided.

The measuring sections 48 have a U-shape, in particular with rectangular corners. The U-shapes are facing towards each other, i.e. the U's are open toward one another.

The measuring sections 48 are aligned with one another and only a small gap is provided between the measuring sections 48 so that the measuring sections 48 form a rectangle.

The control unit 31 may determine the weight on one of the measuring sections 48 separately so that the weight of a smaller display 44, e.g. a one-eighth display 44, may be detected.

Similar to the explanations in the context of FIG. 6, the control unit 31 may determine automatically which measuring sections 48, 50 are to be regarded and evaluated.

FIG. 8 shows a fixation element 54 of the pallet system 10 to secure the measuring component 14 in itself and/or to the pallet 12. The shown fixation elements 54 may be used in any of the embodiments of the pallet system 10 discussed above. In FIG. 8, only the first and second base body 26, 28 of the measuring component 14 is shown for simplicity.

The fixation element 54 may be formed as a single piece.

The fixation element 54 comprises an elongated portion 56, e.g. a rod-like portion or cylindrical portion, having a first end 58 and a second end 60.

At the first end 58, a collar 62 is provided and at the second end 60 at least two flexible tongues 64 are attached and extend towards the first end 58.

The fixation element 54, more precisely the elongated portion 56 extends vertically with respect to the upper surface 18 through openings 66 in the first conductive layer 32 and/or the first base body 26, in the second conductive layer 34 and/or the second base body 28 as well as in in the upper surface 18 of the pallet 12.

The collar 62 has a diameter larger than the diameter of the openings 66 and abuts to the upper surface 18.

In the embodiment shown in FIG. 8, the opening 66 in the upper surface 18 is defined by at least one protrusion 68 that may be ring-shaped, and the flexible tongues 64 engage the protrusion 68 at its lower side, i.e. the side facing away from the upper surface 18. Thus, the measuring component 14 is securely fixed to the pallet 12.

During the assembly, the fixation elements 54 are inserted into the opening 66 from the upper side, i.e. the side of the upper surface 18. When moving through the measuring component 14, the tongues 64 lie close to the elongated portion 56 and extend outwardly as soon as they have passed the protrusion 68 of the upper surface 18.

Further, the construction of the fixation element 54 allows for a downward movement of the fixation element 54 when the measuring component 14 is compressed.

Of course, a pallet system 10 may have more than one fixation element 54, wherein each fixation element 54 is provided in a set of corresponding openings 66.

The embodiments are only exemplary combinations of features and it is of course possible to combine the features discussed above in any other way.

The invention claimed is:

1. A pallet system for transporting goods comprising:
a pallet having a pallet body with an upper surface; and
a measuring component located on top of the upper surface and comprising
a first conductive layer and a second conductive layer spaced apart from each other forming a capacitor with a gap therebetween,
a first base board and a second base board, the first base board supporting the first conductive layer and the second base board supporting the second conductive layer,
with the first base board and the second base board being parallel to the upper surface of the pallet when the measuring component is located on top of the upper surface of the pallet, and the first base board and the second base board extending over at least half of the upper surface,
at least one elastic element arranged within the gap allowing movement of the first base board and the second base board towards each other, and
a control unit electrically connected to the first conductive layer and the second conductive layer, and configured to measure a capacitance of the capacitor.

2. The pallet system according to claim 1 wherein said measuring component comprises a first shielding layer and a second shielding layer, with the first conductive layer and the second conductive layer located between the first shielding layer and the second shielding layer.

3. The pallet system according to claim 2, wherein the first base board supports both the first conductive layer and the first shielding layer, and the second base board supports both the second conductive layer and the second shielding layer.

4. The pallet system according to claim 3, wherein the first base board and the second base board are parallel to each other in an unloaded state of the pallet system, with the first conductive layer at a side of the first base board facing towards the second base board, and with the second conductive layer at a side of the second base board facing towards the first base board.

5. The pallet system according to claim 3, wherein the first base board and the second base board are parallel to each other in an unloaded state of the pallet system, with the first shielding layer at a side of the first base board facing away from the second base body, and with the second shielding layer provided at a side of the second base board facing away from the first base board.

6. The pallet system according to claim 3, wherein the first base board and the second base board are parallel to the upper surface of the pallet, and with the first base board and the second base board extending over at least half of the upper surface of the pallet.

7. The pallet system according claim 1, wherein at least one of the first base board and the second base board is configured as a circuit board comprising a fire resistant material.

8. The pallet system according to claim 7, wherein said control unit is integrated into the circuit board of at least one of the first base board and the second base board.

9. The pallet system according to claim 1, wherein said measuring component has at least one opening corresponding to at least one opening in the upper surface of the pallet.

10. The pallet system according to claim 1, wherein the at least one elastic element has a thickness that varies.

11. The pallet system according to claim 1, wherein the at least one elastic element occupies 10% or less of a total surface area of at least one of the first and second conductive layers, and wherein the at least one elastic element occupies 20% or less of a total volume of the gap occupied by the at least one elastic element between the first and second conductive layers.

12. The pallet system according to claim 1, wherein the at least one elastic element comprises a base portion and a vertical portion, wherein the vertical portions occupies 10% or less of a total surface area of at least one of the first and second conductive layers, and wherein the vertical portion occupies 20% or less of a total volume of the gap occupied by the at least one elastic element between the first and second conductive layers.

13. The pallet system according to claim 1, wherein the pallet comprises a display section for receiving a display, and wherein said measuring component comprises at least one measuring section arranged at the display section.

14. The pallet system according to claim 13, wherein at least one of the display section and the at least one measuring section has a rectangular shape that extends along an edge of the upper surface.

15. The pallet system according to claim 13, wherein said measuring component comprises a pair of measuring sections arranged at the display section, with each measuring section having a U-shape.

16. The pallet system according to claim 13, wherein said measuring component comprises at least one auxiliary measuring section that is surrounded by the at least one measuring section.

17. The pallet system according to claim 1, wherein said measuring component comprises a temperature sensor configured to calibrate measurement of the capacitance of the capacitor.

18. The pallet system according to claim 1, wherein the first conductive layer and the first base board includes openings extending therethrough, wherein the second conductive element and the second base board includes openings extending therethrough, and wherein the pallet system further comprises at least one fixation element extending through at least one of the openings.

19. A measuring component for a pallet system comprising:
a first conductive layer and a second conductive layer spaced apart from each other forming a capacitor with a gap therebetween, with said first and second conductive layers carried by an upper surface of a pallet;
a first base board and a second base board, the first base board supporting the first conductive layer and the second base board supporting the second conductive layer;
with the first base board and the second base board being parallel to the upper surface of the pallet when the measuring component is located on top of the upper surface of the pallet, and the first base board and the second base board extending over at least half of the upper surface;
at least one elastic element arranged within the gap allowing movement of the first base board and the second base board towards each other; and
a control unit electrically connected to the first conductive layer and the second conductive layer, and configured to measure a capacitance of the capacitor.

20. The pallet system according to claim 2, wherein the first conductive layer, the second conductive layer, the first shielding layer and/or the second shielding layer entirely covers the upper surface of the pallet body.

* * * * *